United States Patent
Christopherson et al.

(10) Patent No.: US 11,974,212 B2
(45) Date of Patent: Apr. 30, 2024

(54) METHOD AND SYSTEM FOR CELLULAR DEVICE-SATELLITE COMMUNICATIONS

(71) Applicant: Verizon Patent and Licensing Inc., Basking Ridge, NJ (US)

(72) Inventors: Corey J. Christopherson, Bainbridge Island, WA (US); Manuel Bedoya, South Plainfield, NJ (US); James Byron Jones, Plainfield, IL (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 3 days.

(21) Appl. No.: 17/209,428

(22) Filed: Mar. 23, 2021

(65) Prior Publication Data

US 2022/0312301 A1    Sep. 29, 2022

(51) Int. Cl.
*H04B 7/185* (2006.01)
*H04W 40/24* (2009.01)
*H04W 48/16* (2009.01)

(52) U.S. Cl.
CPC ........ *H04W 48/16* (2013.01); *H04B 7/18515* (2013.01); *H04B 7/18519* (2013.01); *H04B 7/18523* (2013.01); *H04W 40/24* (2013.01)

(58) Field of Classification Search
CPC ............ H04B 7/18515; H04B 7/18517; H04B 7/18519; H04B 7/18523; H04B 7/18526; H04B 7/18528; H04W 40/24; H04W 48/16; H04W 84/06
See application file for complete search history.

(56) References Cited

U.S. PATENT DOCUMENTS

| | | | | |
|---|---|---|---|---|
| 8,406,685 | B2* | 3/2013 | Giloh | H04M 3/2281 455/12.1 |
| 9,014,974 | B2* | 4/2015 | Venkatraman | G01S 19/45 701/470 |
| 9,253,602 | B2* | 2/2016 | Smith | G01C 17/02 |
| 10,003,652 | B2* | 6/2018 | Cha | H04L 67/125 |
| 2012/0309351 | A1* | 12/2012 | Dutta | H04L 2101/65 455/414.1 |
| 2014/0071886 | A1* | 3/2014 | Monte | H04W 92/10 455/430 |
| 2019/0089623 | A1* | 3/2019 | Dion | H04L 47/2408 |
| 2021/0120540 | A1* | 4/2021 | Lo | H04L 65/80 |
| 2021/0274414 | A1* | 9/2021 | Määttanen | H04W 76/28 |
| 2021/0360714 | A1* | 11/2021 | Zhang | H04W 48/18 |
| 2022/0141891 | A1* | 5/2022 | Masini | H04B 7/18528 370/316 |
| 2022/0224406 | A1* | 7/2022 | Xu | H04B 7/18589 |

* cited by examiner

*Primary Examiner* — Alpus Hsu

(57) ABSTRACT

A method, a device, and a non-transitory storage medium are described in which a cellular device-satellite communications service is provided. The service may provide establishment, maintenance, and termination of uplink and downlink connections via a satellite network, a terrestrial network, and both based on network information and satellite information. The service may also provide scheduling for user plane traffic via the uplink and downlink connections.

20 Claims, 14 Drawing Sheets

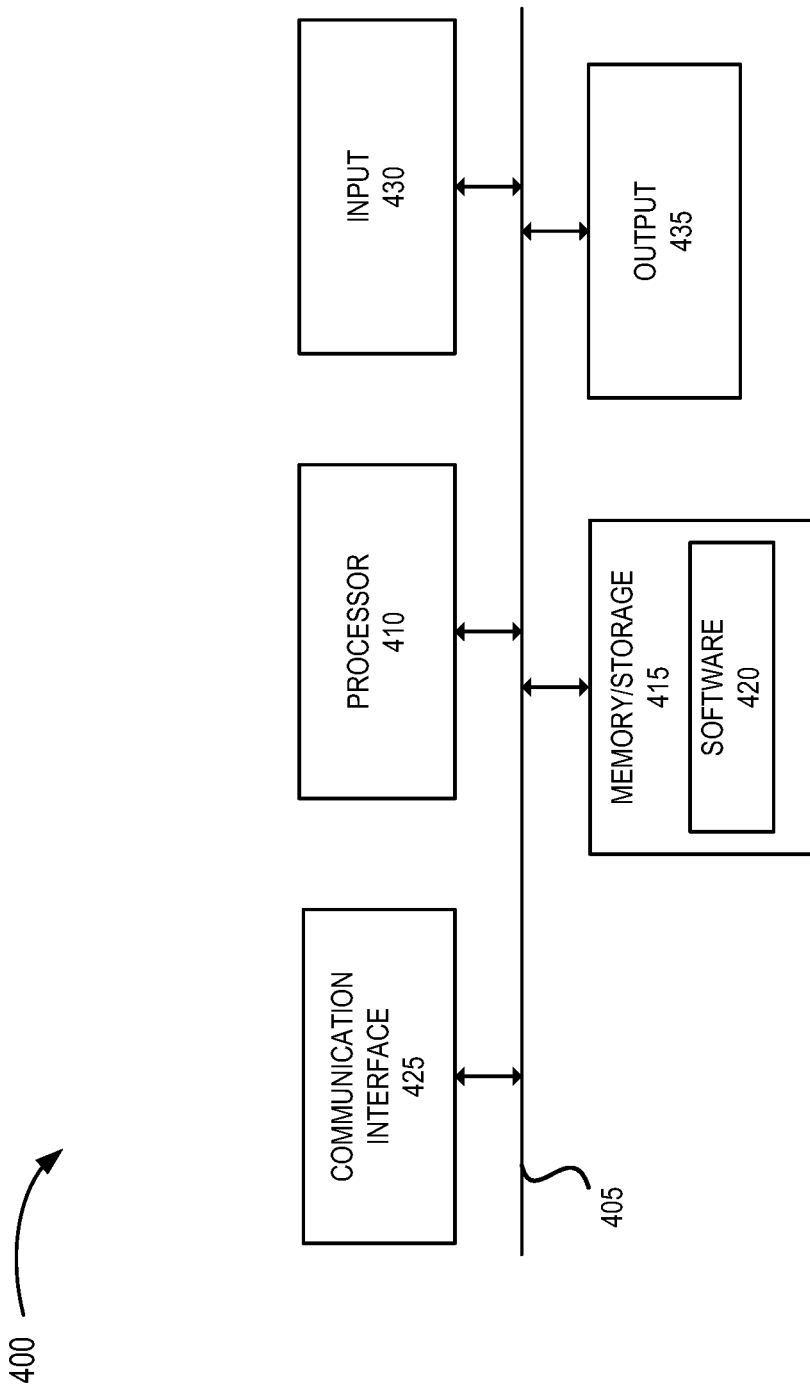

METHOD AND SYSTEM FOR CELLULAR DEVICE-SATELLITE COMMUNICATIONS

BACKGROUND

Satellite communication may be used in different mobile applications that may involve communication with ships, vehicles, and radio and television broadcasting services.

BRIEF DESCRIPTION OF THE DRAWINGS

FIG. 4 is a diagram illustrating exemplary components of a device that may correspond to one or more of the devices illustrated and described herein.

DETAILED DESCRIPTION

Figure 1:
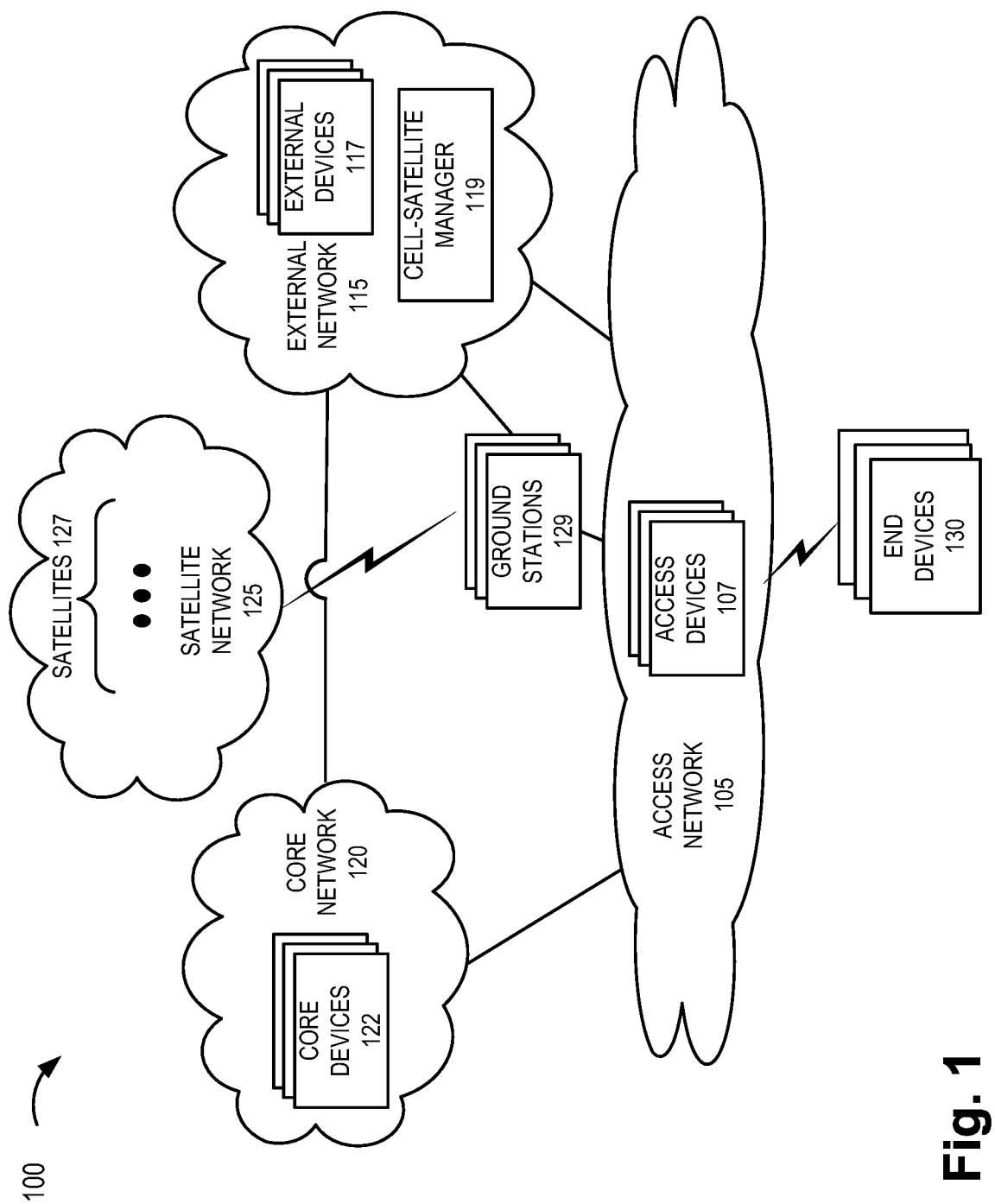
FIG. 1 is a diagram illustrating an exemplary environment in which an exemplary embodiment of a cellular device-satellite communications service may be implemented.

The following detailed description refers to the accompanying drawings. The same reference numbers in different drawings may identify the same or similar elements. Also, the following detailed description does not limit the invention.

A satellite service may include a fixed satellite service, a broadcasting satellite service, or a mobile satellite service, for example. For mobile satellite services, such services may pertain to maritime, aeronautical, broadcasting (e.g., one-way audio, video, data), land mobile (e.g., trains and other transportation systems), and personal mobile (e.g., telephone service), for example. Currently, Low Earth Orbit (LEO) satellite constellations are being deployed with a purpose for worldwide communications. However, with current systems, it is difficult to provide two-way satellite-mobile device communication due to uplink limitations of a cellular device and associated antenna and transmission power. Thus, the wide array of current application services available for users via terrestrial radio access networks (RANs) and core networks (e.g., Fourth Generation (4G), Fifth Generation (5G), and beyond) are not provided via a personal mobile device and satellite system.

According to exemplary embodiments, a cellular device-satellite communications service is described. According to an exemplary embodiment, the cellular device-satellite communications service may include a network device configured for facilitating or supporting uplink and/or downlink communications of an application service between an end device and a satellite (e.g., a LEO satellite). According to an exemplary embodiment, the end device may be a 4G, a 5G, or another type of cellular end device. According to various exemplary embodiments, the cellular device-satellite communications service may be implemented for outdoor and indoor use cases. According to an exemplary embodiment, the cellular device-satellite communications service may configure satellite resources as a primary connection to the application service, as described herein. For example, the cellular device-satellite communications service may transmit application service traffic in an uplink from an end device to a satellite via a ground station or a RAN device and the ground station. According to another exemplary embodiment, the cellular device-satellite communications service may configure satellite resources as a secondary connection to supplement the delivery of the application service, as described herein. For example, the cellular device-satellite communication service may transmit application service traffic in respective terrestrial and satellite uplinks from an end device. According to yet another exemplary embodiment, the cellular device-satellite communications service may configure an uplink using only terrestrial resources. Similarly, according to an exemplary embodiment, the cellular device-satellite communications service may transmit application service traffic in the downlink to the end device where satellite resources may be used as a primary connection, a secondary connection, or not at all. According to an exemplary embodiment, the application service may include broadband services, as described herein, which may be more demanding in terms of throughput, latency, and/or other performance metrics relative to a telephone service or another type of low bandwidth service, for example.

According to an exemplary embodiment, the network device may provide a scheduling and communication management service for communications, as described herein. The network device may be communicatively coupled to a RAN and/or RAN devices. The network device may be communicatively coupled to a ground station, which is communicatively coupled to a satellite network. According to various exemplary embodiments, the network device that provides the cellular device-satellite communications service may reside in various types of networks, such as a RAN, a core network, and/or an application layer network, or co-located to a network device included in the RAN, the core network, and/or the application layer network, for example.

In view of the foregoing, the cellular device-satellite communications service may improve system performance between end devices and application services. For example, the cellular device-satellite communications service may improve downlink, uplink, or uplink and downlink coverage for application services and end devices. The cellular device-satellite communications service may increase throughput, data rate, reliability, latency, and other performance metrics of communications based on the connectivity to application services provided. Also, the cellular device-satellite communications service may improve other performance indicators, such as a key performance indicator (KPI), quality of experience (QoE), a service level agreement (SLA) requirement, user experience, and/or a mean opinion score (MOS), for example.

FIG. 1 is a diagram illustrating an exemplary environment 100 in which an exemplary embodiment of cellular device-satellite communications service may be implemented. As illustrated, environment 100 may include an access network 105, an external network 115, a core network 120, a satellite network 125, and ground station 129. Access network 105 includes access devices 107 (also referred to individually or generally as access device 107). External network 115 includes external devices 117 (also referred to individually or generally as external device 117) and a cell-satellite manager (CSM) 119. Core network 120 includes core devices 122 (also referred to individually or generally as core device 122). Satellite network 125 includes satellites 127 (also referred to individually or generally as satellite 127). Environment 100 further includes ground stations 129 (also referred to individually or generally as ground station 129) and end devices 130 (also referred to individually or generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network (e.g., Signaling System No. 7 (SS7), etc.), or other type of network that may support a wireless service and/or an application service, as described herein.

The number, the type, and the arrangement of network devices, and the number of end devices 130 are exemplary. A network device may be implemented according to one or multiple architectures, such as a client device, a server device, a peer device, a proxy device, a cloud device, and/or a virtualized network device. Additionally, the network device may be implemented according to various computing architectures, such as centralized, distributed, cloud (e.g., elastic, public, private, etc.), edge network, fog network, and/or another type of computing architecture, and may be incorporated into various types of network architectures (e.g., software defined network (SDN), virtual network, logical network, network slice, etc.).

Environment 100 includes communication links between the networks, between the network devices, and between end devices 130 and the network/network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication.

Access network 105 may include one or multiple networks of one or multiple types and technologies. For example, access network 105 may be implemented to include a 5G-access network (5G-AN) or a 5G-RAN, a future generation RAN (e.g., a 6G RAN or subsequent generation RAN). Access network 105 may include a legacy RAN (e.g., a Third Generation (3G) RAN, a 4G or 4.5 RAN, etc.). Access network 105 may communicate with and/or include other types of access networks, such as, for example, a WiFi network, a Worldwide Interoperability for Microwave Access (WiMAX) network, a local area network (LAN), a Citizens Broadband Radio System (CBRS) network, a cloud RAN, an O-RAN network, a virtualized RAN (vRAN), a self-organizing network (SON), a wired network (e.g., optical, cable, etc.), or another type of network that provides access to or can be used as an on-ramp to access network 105, external network 115, core network 120, and/or satellite network 125. According to an exemplary embodiment, access network 105 may provide cellular device-satellite communications service, as described herein.

Access network 105 may include different and multiple functional splitting, such as options 1, 2, 3, 4, 5, 6, 7, or 8 that relate to combinations of access network 105 and core network 120 including an EPC network and/or an NG core (NGC) network, or the splitting of the various layers (e.g., physical layer, medium access control (MAC) layer, radio link control (RLC) layer, and packet data convergence protocol (PDCP) layer, etc.), plane splitting (e.g., user plane, control plane, etc.), dual connectivity (DC) or higher (e.g., a secondary cell group (SCG) split bearer service, a master cell group (MCG) split bearer, an SCG bearer service, non-standalone (NSA), standalone (SA), etc.), carrier aggregation (CA) (e.g., intra-band, inter-band, contiguous, non-contiguous, etc.), edge and core network slicing, coordinated multipoint (CoMP), various duplex schemes (e.g., frequency division duplex (FDD), time division duplex (TDD), half-duplex FDD (H-FDD), etc.), and/or another type of connectivity service (e.g., NSA NR, SA NR, etc.).

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of cell architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, licensed radio spectrum, unlicensed radio spectrum, above mm wave), and/or other attributes or technologies used for radio communication. Additionally, or alternatively, according to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an evolved LTE (eLTE) evolved Node B (eNB), an eNB, a radio network controller (RNC), a remote radio head (RRH), a baseband unit (BBU), a radio unit (RU), a centralized unit (CU), a CU control plane (CU CP), a CU user plane (CU UP), a distributed unit (DU), a small cell node (e.g., a picocell device, a femtocell device, a microcell device, a home eNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a seventh generation (7G) wireless station, etc.), another type of wireless node (e.g., a WiFi device, a WiMax device, a hotspot device, etc.) that provides a wireless access service, or another type of network device that provides a transport service (e.g., routing and forwarding), such as a router, a switch, or another type of layer 3 (e.g., network layer of the Open Systems Interconnection (OSI) model) network device. Additionally, or alternatively, access device 107 may include a wired and/or optical device (e.g., modem, wired access point, optical access point, Ethernet device, etc.) that provides network access. According to some exemplary implementations, access device 107 may include a combined functionality of multiple RATs (e.g., 4G and 5G functionality, 5G and 5.5G functionality, etc.) via soft and hard bonding based on demands and needs. According to some exemplary implementations, access device 107 may include an integrated functionality, such as a CU-CP and a CU-UP, or other integrations of split RAN nodes. Access device 107 may be an indoor device or an outdoor device. Access device 107 may include a controller device. For example, access device 107 may include a RAN Intelligent Controller (MC). According to various exemplary embodiments, one or multiple types of access devices 107 may provide cellular device-satellite communications service, as described herein.

External network 115 may include one or multiple networks of one or multiple types and technologies. For example, external network 115 may be implemented to include a service or an application-layer network, a cloud network, a private network, a public network, a multi-access edge computing (MEC) network (also known as a mobile edge computing network), a fog network, the Internet, a service provider network, the World Wide Web (WWW), an Internet Protocol Multimedia Subsystem (IMS) network, a Rich Communication Service (RCS) network, an SDN, a virtual network, a packet-switched network, a data center, or other type of network that may provide access to and may host an end device application, service, or asset (also referred to as an "application service").

Depending on the implementation, external network 115 may include various network devices such as external devices 117. For example, external devices 117 may include servers (e.g., web, application, cloud, etc.), mass storage devices, data center devices, network function virtualization (NFV) devices, containers, virtual machines, SDN devices, cloud computing devices, platforms, and other types of network devices, platforms, and/or architectures pertaining to various network-related functions (e.g., security, management, charging, billing, authentication, authorization, policy enforcement, development, etc.). External network 115 may include one or multiple types of core devices 122, as described herein.

External devices 117 may host one or multiple types of application services. For example, the application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), IoTs (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), voice, conferencing, instant messaging), video streaming, and/or other types of wireless and/or wired application services.

Cell-satellite manager 119 may include a network device that provides cellular device-satellite communications service, as described herein. For example, cell-satellite manager 119 may receive requests for downlink and/or uplink communications and coordinate their execution based on satellites 127, ground station 129, and access network 105. Cell-satellite manager 119 may manage the routing of the communication via satellite and/or terrestrial resources based on various criteria, as described herein. Although cell-satellite manager 119 is illustrated in external network 115, according to other exemplary embodiments, cell-satellite manager 119 may reside elsewhere in environment 100. Cell-satellite manager 119 is described further herein.

Core network 120 may include one or multiple networks of one or multiple network types and technologies. Core network 120 may include a complementary network of access network 105. For example, core network 120 may be implemented to include an NGC network, an EPC of an LTE network, an LTE-Advanced (LTE-A) network, and/or an LTE-A Pro network, a future generation core network (e.g., a 6G or beyond core network, etc.), and/or another type of core network.

Depending on the implementation of core network 120, core network 120 may include various types of network devices that are illustrated in FIG. 1 as core devices 122. For example, core devices 122 may include a user plane function (UPF), a Non-3GPP Interworking Function (N3IWF), an access and management mobility function (AMF), a session management function (SMF), a unified data management (UDM) device, a unified data repository (UDR) device, an authentication server function (AUSF), an NSSF, a network repository function (NRF), a policy control function (PCF), a binding support function (BSF), a network data analytics function (NWDAF), a network exposure function (NEF), a lifecycle management (LCM) device, an application function (AF), a mobility management entity (MME), a packet gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS). According to other exemplary implementations, core devices 122 may include additional, different, and/or fewer network devices than those described. For example, core devices 122 may include a non-standard or a proprietary network device, and/or another type of network device that may be well-known but not particularly mentioned herein. Core devices 122 may also include a network device that provides a multi-RAT functionality (e.g., 4G and 5G, 5G and 5.5G, 5G and 6G, etc.), such as an SMF with PGW control plane functionality (e.g., SMF+PGW-C), a UPF with PGW user plane functionality (e.g., UPF+PGW-U), a service capability exposure function (SCEF) with a NEF (SCEF+NEF), and/or other combined nodes (e.g., an HSS with a UDM and/or UDR, an MME with an AMF, etc.).

Satellite network 125 may include one or multiple types of satellite networks of one or multiple technologies. For example, satellite network 125 may include a LEO satellite network, a medium earth orbit (MEO) satellite network, a geostationary or geosynchronous orbit (GEO) satellite network, or another type of satellite network (e.g., future generation, non-LEO, non-MEO, non-GEO, etc.). Satellite 127 may include a satellite, such as a LEO satellite, a MEO satellite, a GEO satellite, or another type of satellite. Satellite network 125 and satellites 127 may provide cellular device-satellite communications service. Satellite network 125 may include ground station 129.

Ground station 129 may include a ground station (also known as an earth station, for example) that is configured to communicate with satellites 127 of satellite network 125. For example, ground station 129 may transmit data to satellite 127, receive data from satellite 127, or both. Ground station 129 may provide cellular device-satellite communications service. According to some exemplary embodiments, access device 107 may be integrated with ground station 129. According to some exemplary embodiments, ground station 129 may be configured to communicate directly or indirectly (e.g., via access device 107) to end device 130. According to such exemplary embodiments, ground station 129 may include antennas and communication logic for communication to and from satellites 127 and other antennas and other communication logic for communication to and from end devices 130. According to some exemplary embodiments, ground station 129 may be co-located with access device 107.

End devices 130 include a device that may have computational and communication capabilities (e.g., wireless, wired, optical, etc.). End device 130 may be implemented as a mobile device, a portable device, a stationary device (e.g., a non-mobile device), a device operated by a user, or a device not operated by a user. For example, end device 130 may be implemented as a smartphone, a mobile phone, a personal digital assistant, a tablet, a netbook, a phablet, a wearable device (e.g., a watch, glasses, etc.), a computer, a gaming device, a music device, an Internet of Things (IoT) device, a drone, a smart device, or other type of wireless device (e.g., other type of user equipment (UE)). End device 130 may be configured to execute various types of software (e.g., applications, programs, etc.). The number and the types of software may vary among end devices 130.

End device 130 may support one or multiple RATs (e.g., 4G, 5G, and/or future generation RAT) and various portions of the radio spectrum (e.g., multiple frequency bands, multiple carrier frequencies, licensed, unlicensed, mm wave, above mm wave, etc.), various levels and genres of network slicing, DC service, and/or other types of connectivity services. Additionally, end device 130 may include one or multiple communication interfaces that provide one or multiple (e.g., simultaneous, interleaved, etc.) connections via the same or different RATs, frequency bands, carriers, network slices, and/or other communication medium (e.g., wired, etc.). The multimode capabilities of end device 130 may vary among end devices 130. According to an exemplary embodiment, end device 130 may provide cellular device-satellite communications service, as described herein.

Figure 2:
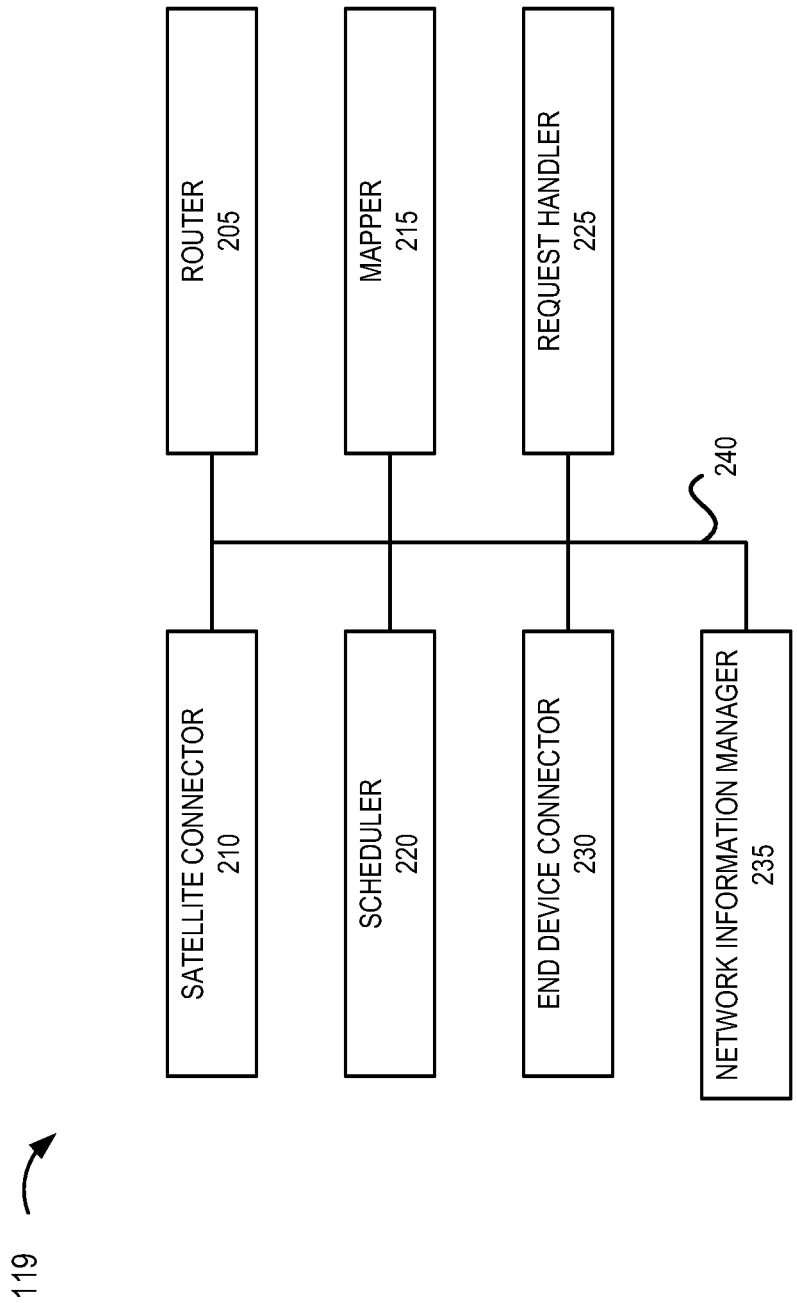
FIG. 2 is a diagram illustrating exemplary components of an exemplary embodiment of a cell-satellite manager that provides an exemplary embodiment of cellular device-satellite communication service.

FIG. 2 is a diagram illustrating exemplary components of an exemplary embodiment of cell-satellite manager 119. As illustrated, cell-satellite manager 119 may include a satellite router 205, a satellite connector 210, a mapper 215, a scheduler 220, a request handler 225, an end device connector 230, and a network information manager 235, and a link 240. The number, type, and arrangement of components and links are exemplary. According to other exemplary embodiments, cell-satellite manager 119 may include additional, fewer, and/or different components to provide cellular device-satellite communications service, a sub-service, a function, and/or a step of a process in support of cellular device-satellite communications service.

According to an exemplary embodiment, cell-satellite manager 119 may communicate with other network devices via a control plane. For example, cell-satellite manager 119 may receive from and/or transmit to signaling and/or control messages relative to access device 107, external device 117, core device 122, satellite 125, and/or ground station 129.

Satellite router 205 may include logic that maintains and manages satellite routing information relating to satellites 127 of satellite network 125. For example, satellite router 205 may determine where and/or how traffic may be routed via satellites 127 based on a routing table or another suitable routing information structure.

Satellite connector 210 may include logic that manages information indicating satellites 127 that are connected to ground stations 129. The position of satellite 127 may change over time and satellite connector 210 may continuously update this information based on aerial/orbital flight information relative to a terrestrial geographic area.

Mapper 215 may include logic that determines whether an uplink communication and/or a downlink communication is supported by a satellite route, a terrestrial route, or a satellite and a terrestrial route. According to an exemplary embodiment, mapper 215 may determine whether the satellite route, the terrestrial route, or both are to be used to support the uplink communication or the downlink communication based on various criteria. For example, criteria may include a congestion level associated with a network (e.g., in access network 105, core network 120, or another network), a channel condition (e.g., Reference Signal Receive Power (RSRP) value, a Received Signal Strength Indicator (RSSI) value, a Reference Signal Received Quality (RSRQ) value, a signal-to-noise ratio (SNR) value, a signal-to-interference-plus-noise ratio (SINR) value, and/or some other measurable condition) between end device 130 and access device 107, a threshold performance metric associated with an application service (e.g., throughput, latency, and/or another type of metric), resource utilization values, and/or other network information that may be obtained by network information manager 235.

Scheduler 220 may include logic that provides scheduling for uplink and/or downlink communications via access devices 107 of access network 105, ground stations 129, and satellites 127 of satellite network 125. Scheduler 220 may use information such as end device information, request information, satellite connection information, satellite routing information, and network information, and logic of other components of cell-satellite manager 119, to make scheduling decisions and calculate a schedule that may be optimal. For example, scheduler 220 may make scheduling decisions based on determinations made by mapper 215, such as whether an uplink communication or downlink communication is supported by only a terrestrial route, a satellite route, or both.

Request handler 225 may include logic that manages uplink requests, downlink requests, or both. For example, the requests may pertain to the establishment of an application service session or a request pertaining to the transmission of downlink traffic or uplink traffic occurring during the application service session. Request handler 225 may manage other types of requests, commands, and/or other messages that may occur during the application service session. For example, a message from end device 130 to pause a video stream, a command from end device 130 to change a user's viewing perspective during a virtual reality session, or another type of control message. Request handler 225 may also manage messages that relate to the termination of an application service session.

Request handler 225 may provide scheduling messages, which may pertain to uplink and/or downlink user plane traffic, to end devices 130, access devices 107, and ground stations 129, for example, based on scheduler 220.

End device connector 230 may include logic that ingests and manages end device information pertaining to end devices 130 that may be connected to access device 107, ground station 129, or both and are subject to cellular device-satellite communications service by cell-satellite manager 119. For example, end device connector 230 may ingest and store identifiers that identify end devices 130, such as a Mobile Station International Subscriber Directory Number (MSISDN), an International Mobile Subscriber Identity (IMSI), a UE identifier, a Subscription Permanent Identifier (SUPI), an International Mobile Equipment Identity (IMEI), a Mobile Equipment Identifier (MEID), a permanent equipment identifier (PEI), a temporary identifier, or another suitable user and/or end device identifier. The end device information may include other types of information pertaining to application service requests, such as application service identifiers that identify an application service, a category of an application service (e.g., extreme real-time, IoT, or another type of application service), threshold performance metric values (e.g., relating to throughput, latency, error rate, and/or another type of performance metric value) associated with the application service. The end device information may further include mobility information pertaining to end devices 130, prospective handovers between access devices 107, and/or other context information of relevance that may be used to support cellular device-satellite communications service.

Network information manager 235 may include logic that ingests and manages network-related information. For example, the network information may include load or utilization values and/or available resource values pertaining to various types of resources (e.g., physical, virtual, logical, hardware, software, communication interfaces, etc.) associated with network devices (e.g., access devices 107, external devices 117, core device 122, satellites 127, ground stations 129, etc.) and communication links (e.g., wireless, wired, optical, etc.), radio resources, satellite resources, information pertaining to data radio bearers, uplink and downlink channels, subscription information pertaining to end device 130 (e.g., from an HSS or UDM of core network 120), and so forth. The state information may include other types of data, such data indicating a key performance indicator (KPI), a performance metric value (e.g., delay, throughput, etc.) pertaining to user plane/application layer data, a level of congestion data (e.g., low, medium, high, or other value), and/or data indicating a current and/or predictive network condition attributable to congestion, a failure (e.g., network device failure, communication link failure, outage, etc.), or another type of network condition. The state information may also include number of service requests (e.g., new RRC requests, application service requests, attachment requests, etc.) received over a period of time relative to a geographic area, a particular network device, and so forth. The network information may be ingested via a control plane of a communication link, for example.

Link 240 may provide a communicative link between two or more components in which data may be communicated. For example, link 240 may be implemented as a hardware link (e.g., a bus, a shared memory space, or another hardware component), a software link (e.g., inter-process communication (IPC), etc.) or some other type of communication link (e.g., an application programming interface (API), etc.).

Figure 3A:
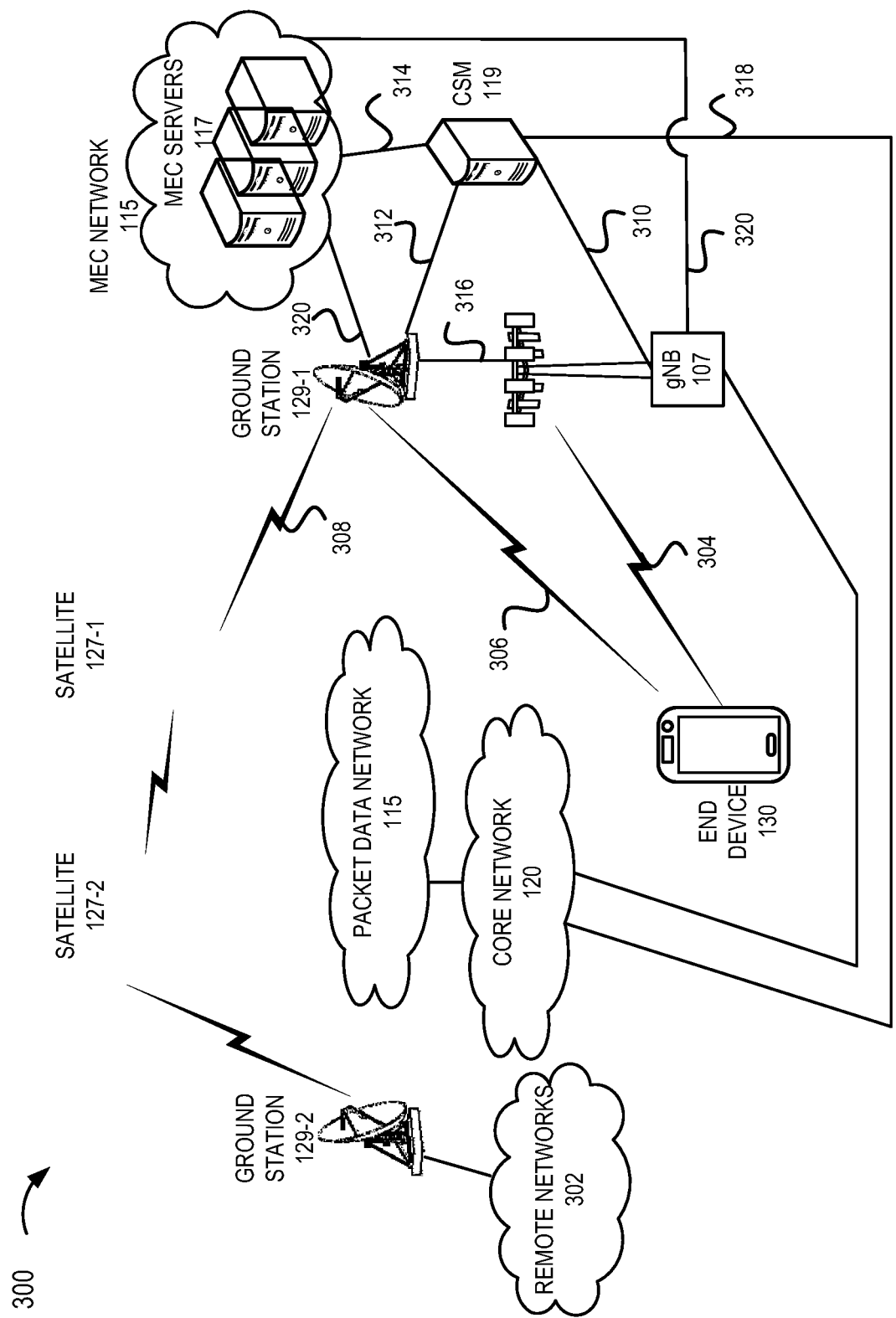
FIG. 3A is a diagram illustrating another exemplary environment in which an exemplary embodiment of cellular device-satellite communications service may be implemented.

FIG. 3A is a diagram illustrating another exemplary environment 300 in which an exemplary embodiment of cellular device-satellite communications service may be implemented. As illustrated, environment 300 may include a gNB 107, a packet data network 115, MEC servers 117 of a MEC network 115, CSM 119, core network 120, satellites 127-1 and 127-2, ground stations 129-1 and 129-2, end device 130, and remote networks 302. The number, the type, and the arrangement of network devices, networks, and end devices 130 are exemplary.

gNB 107 is an example of access device 107. Although not illustrated, gNB 107 may connect to other access devices 107 of access network 105. MEC network 115 and MEC servers are examples of external network 115 and external devices 115. Additionally, packet data network 115 is another example of external network 115. For example, packet data network 115 may be implemented as the Internet, an IMS network, a data center, or another type of application layer network that may include network devices that host application services. Remote networks 302 may include access network 105, external network 115, core network 120, CSM 119, other types of network and/or network devices that are remote from those previously described. For example, in some cases, remote networks 302 may include a remote gNB 107 of the same access network 105 of gNB 107 or of a different access network 105. Given the potential geographic reach of satellites 127, remote networks 302 may be on a coastal scale, a country-wide scale, a continental scale, a global or international scale, or another type of geographic scale, for example.

As further illustrated, environment 300 may include various communication links between networks, between end device 130 and a network device, and between network devices. According to various exemplary embodiments, the communication links illustrated may support control plane and user plane communications, control plane communications, or user plane communications. The number, arrangement, and type of connections are exemplary, and according to other exemplary embodiments, additional, different, and/or fewer communication links, arrangement of communication links, and/or type of communication links may be different.

Communication link 304 may support user plane and control plane wireless communications between end device 130 and gNB 107. According to some embodiments, environment 300 may include a communication link 306 between end device 130 and ground station 129-1. According to such an exemplary embodiment, communication link 306 may support user plane and/or control plane wireless communication. A communication link 308 may support user plane and control plane wireless communication between ground station 129-1 and satellite 127-1. Communication links 310, 312, 314, and 318 may support control plane communication between CSM 119 and gNB 107, ground station 129-1, MEC network 115, and core network 120. Although not illustrated, CSM 119 may include a communication link with packet data network 115, for example. According to some exemplary embodiments, environment 300 may include a communication link 316 between gNB 107 and ground station 129-1. According to such an embodiment, communication link 316 may support user plane and optionally control plane communication between gNB 107 and ground station 129-1. Additionally, for example, according to such an exemplary embodiment, communication link 306 may or may not be omitted. Communication link 320 may support at least user plane communication between ground station 129-1 and MEC network 115/MEC servers 117.

Figure 3B:
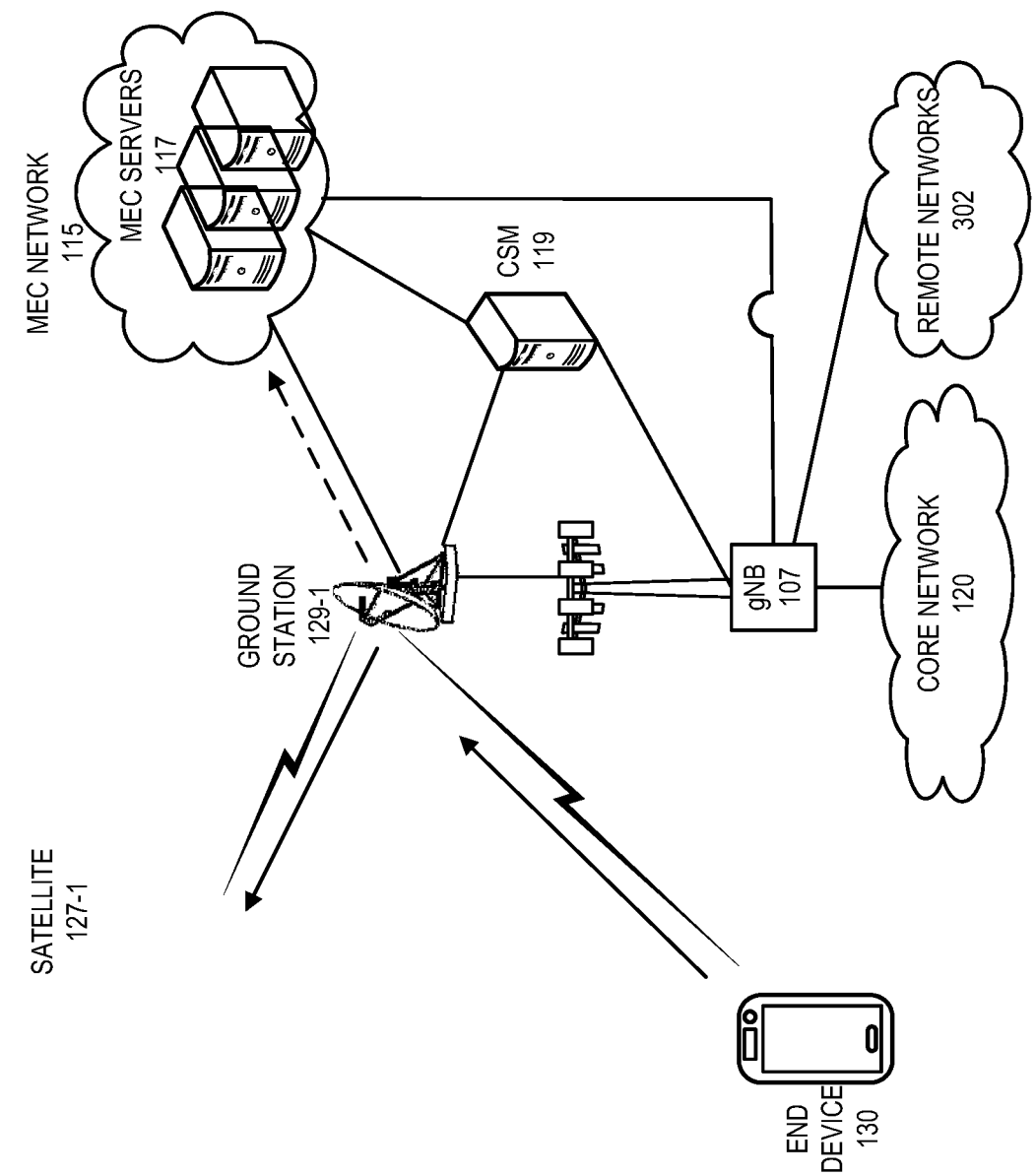
FIGS. 3B-3E are diagrams illustrating exemplary uplink configurations of an exemplary embodiment of cellular device-satellite communications service.
Figure 3C:
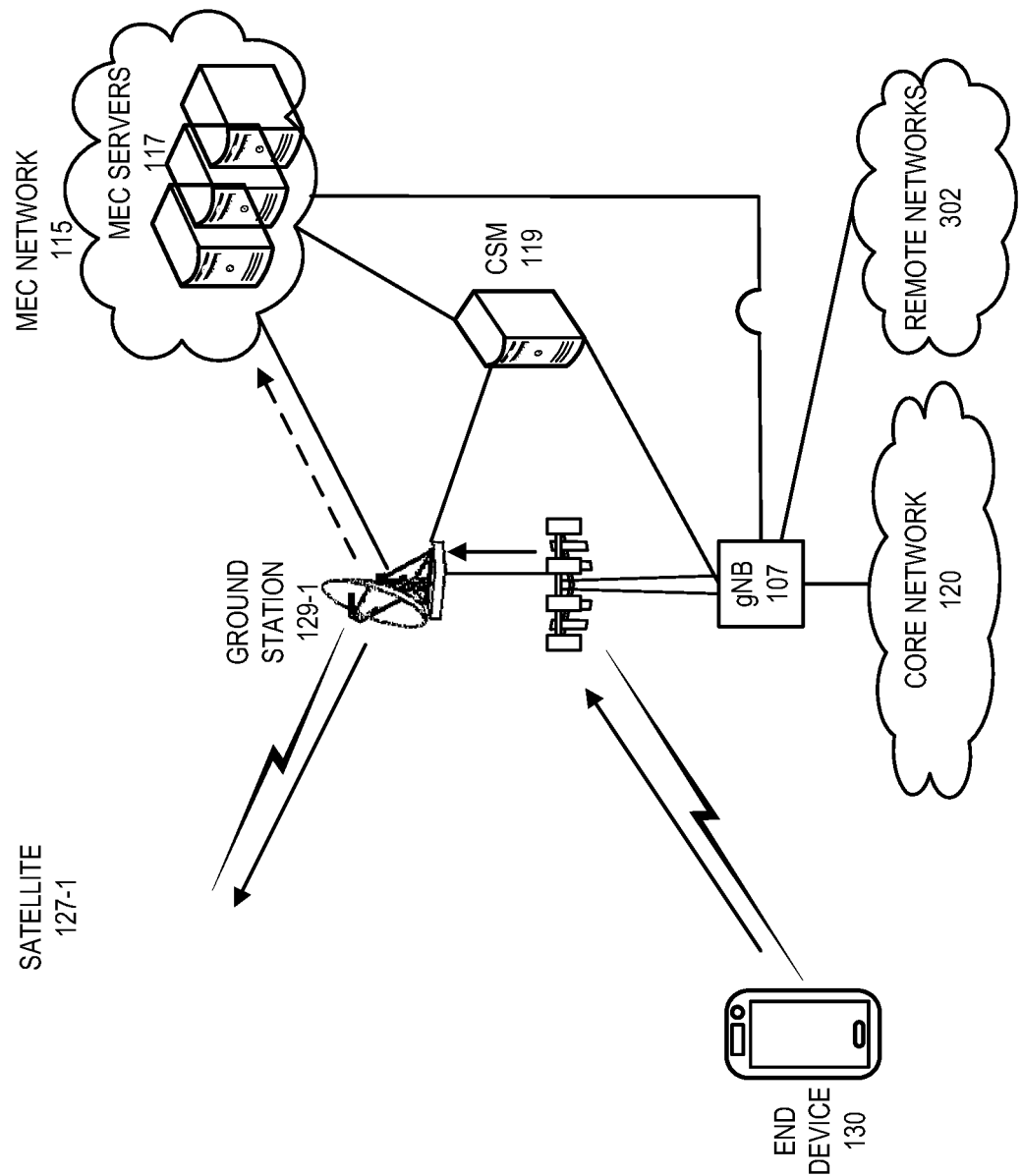
Figure 3D:
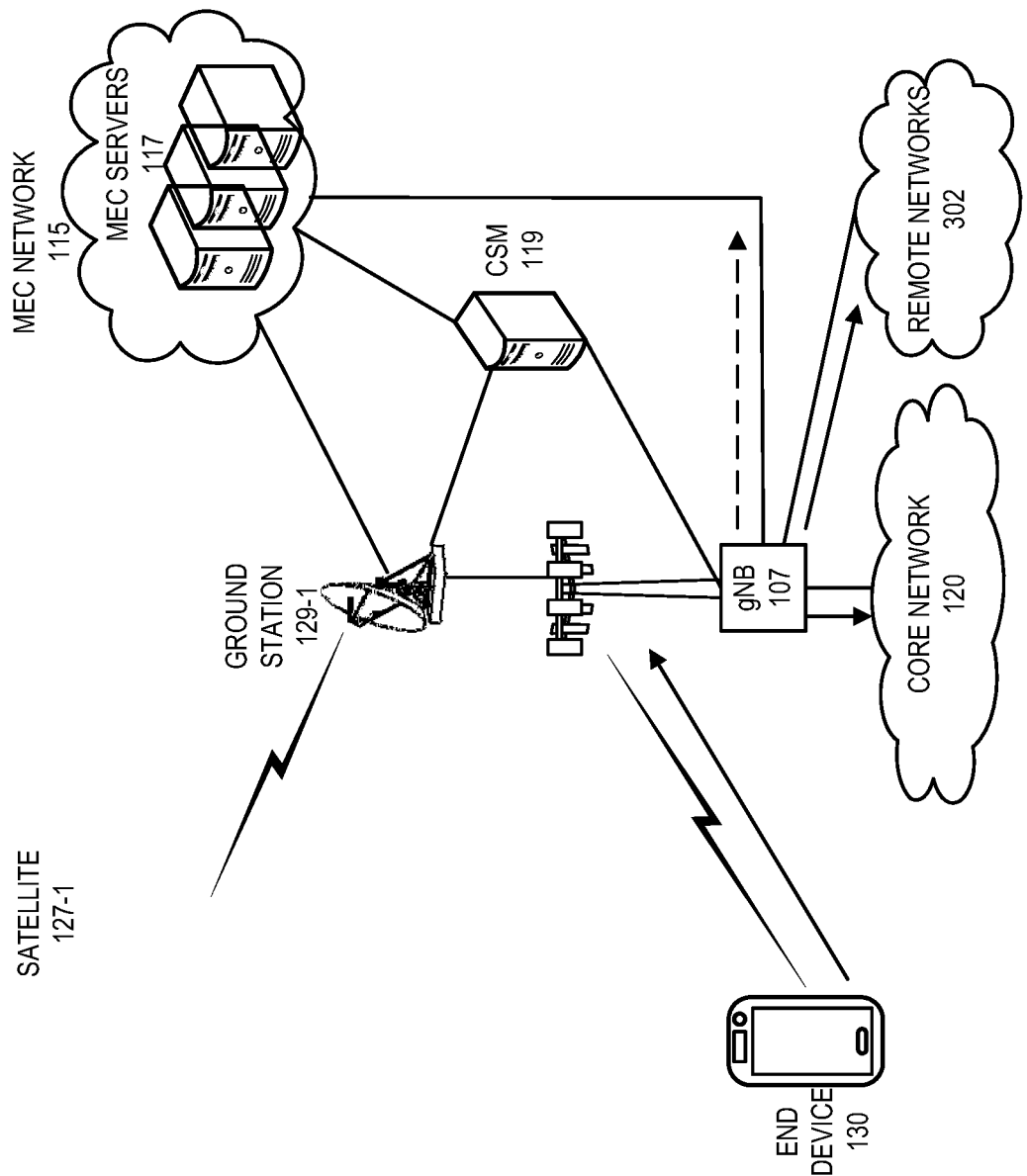
Figure 3E:
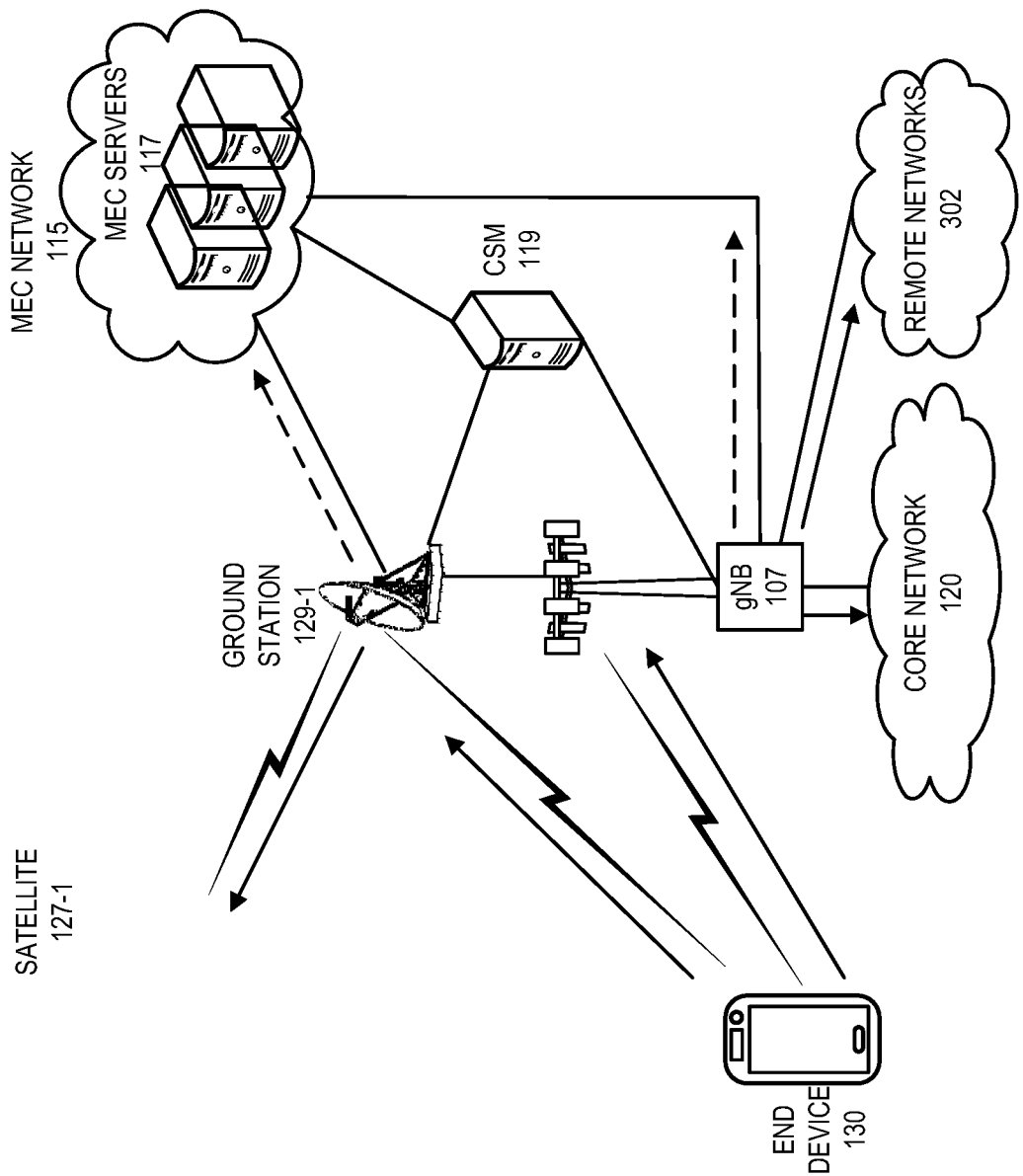

FIGS. 3B-3E are diagrams illustrating exemplary uplink configurations of an exemplary embodiment of cellular device-satellite communications service. Referring to FIG. 3B, according to an exemplary uplink configuration 325, an uplink connection or uplink traffic may flow from end device 130 to ground station 129-1. Depending on the destination, the uplink connection or traffic flow may be between ground station 129-1 and satellite 127-1 and then onward, or between ground station 129-1 to MEC network 115, for example. Referring to FIG. 3C, according to another exemplary uplink configuration 335, an uplink connection or uplink traffic may flow from end device 130 to ground station 129-1 via gNB 107. Depending on the destination, the uplink connection or traffic flow may be between ground station 129-1 and satellite 127-1 and then onward, or between ground station 129 to MEC network 115, for example. Referring to FIG. 3D, according to yet another exemplary uplink configuration 345, a terrestrial only uplink connection or uplink traffic may flow from end device 130 to gNB 107. Depending on the destination, the uplink connection or traffic flow may be between gNB 107 and core network 120, a remote network 302, and so forth, or gNB 107 to MEC network 115, for example. Referring to FIG. 3E, according to still another exemplary uplink configuration 355, a dual connectivity uplink configuration including both terrestrial and satellite connections/traffic flows may be from end device 130 to gNB 107 and end device 130 to ground station 129-1. Depending on the destination, the satellite uplink connection or traffic flow may be between ground station 129-1 and satellite 127-1 and then onward, or between ground station 129-1 to MEC network 115, for example. Similarly, depending on the destination, the uplink connection or traffic flow may be between gNB 107 and core network 120, a remote network 302, and so forth, or gNB 107 to MEC network 115, for example.

Figure 3F:
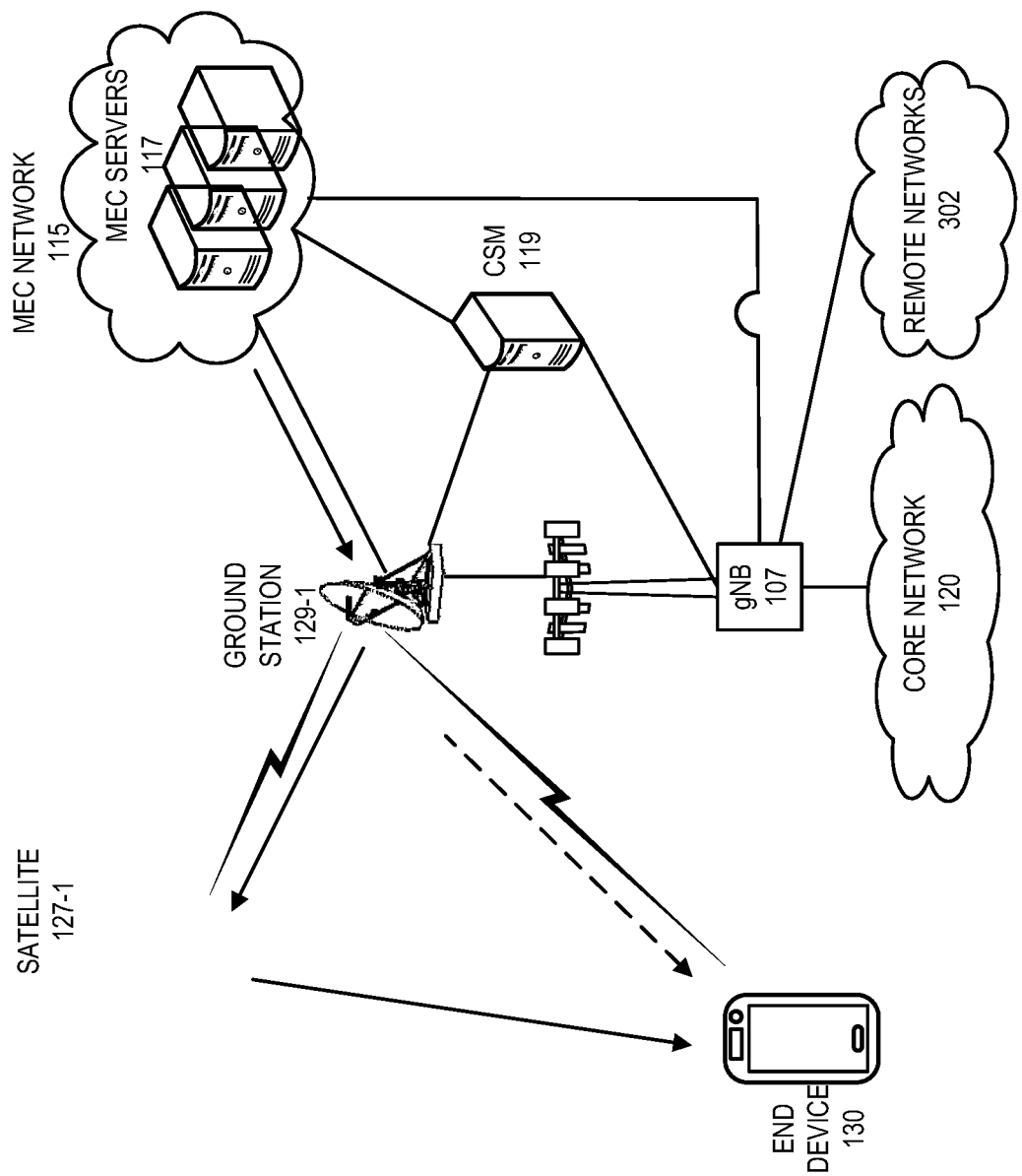
FIGS. 3F-3I are diagrams illustrating exemplary downlink configurations of an exemplary embodiment of cellular device-satellite communications service.
Figure 3G:
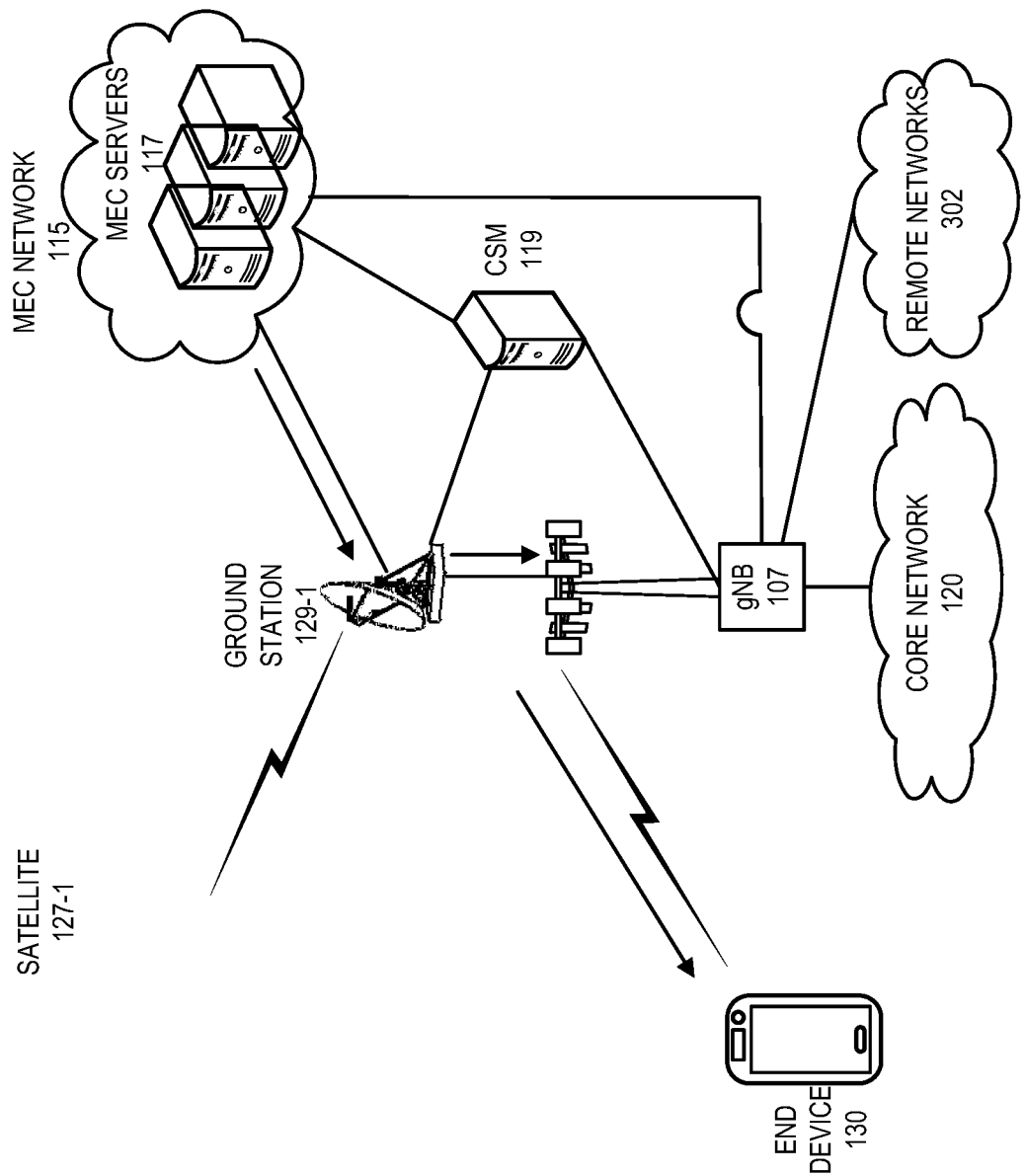
Figure 3H:
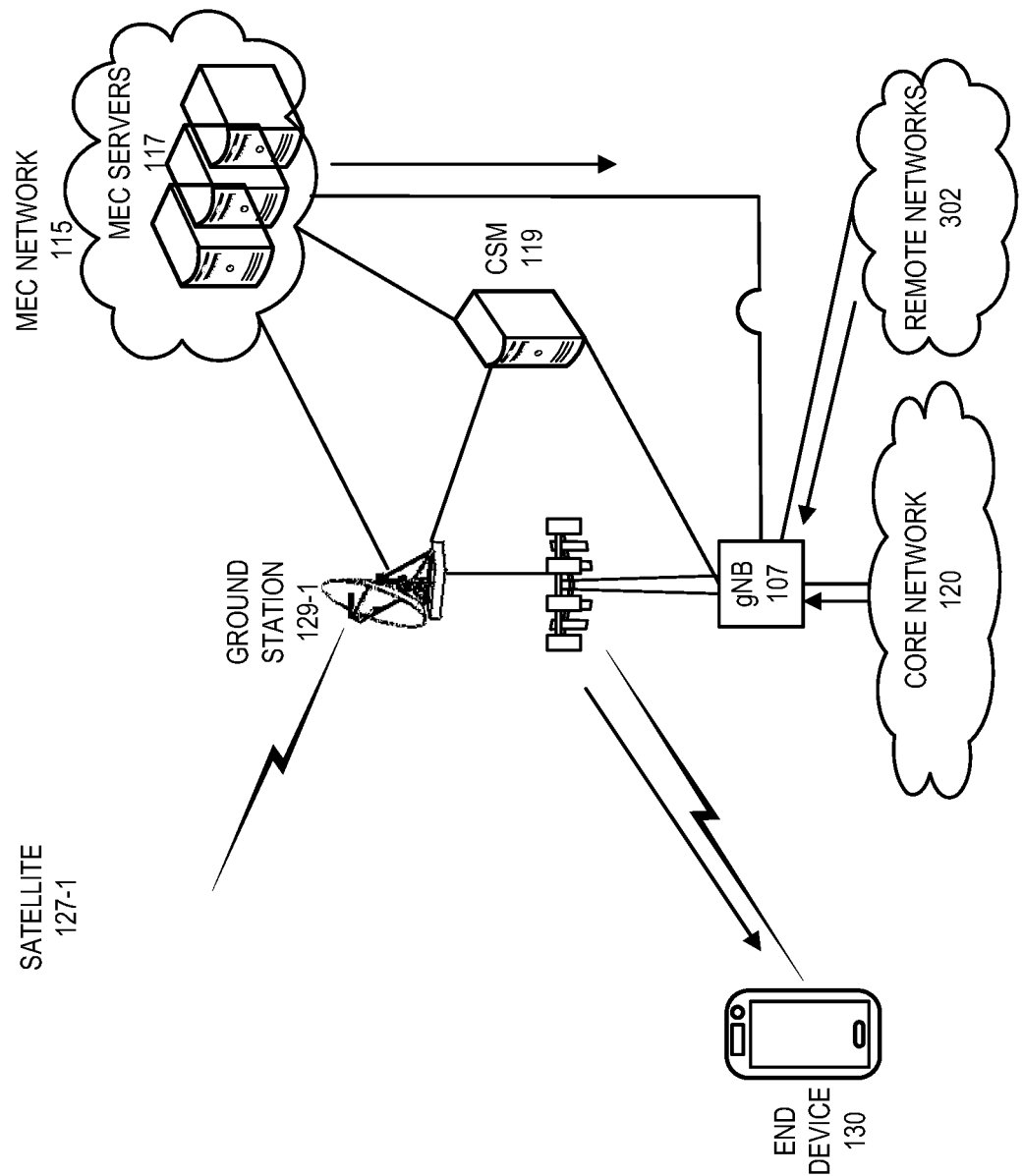
Figure 3I:
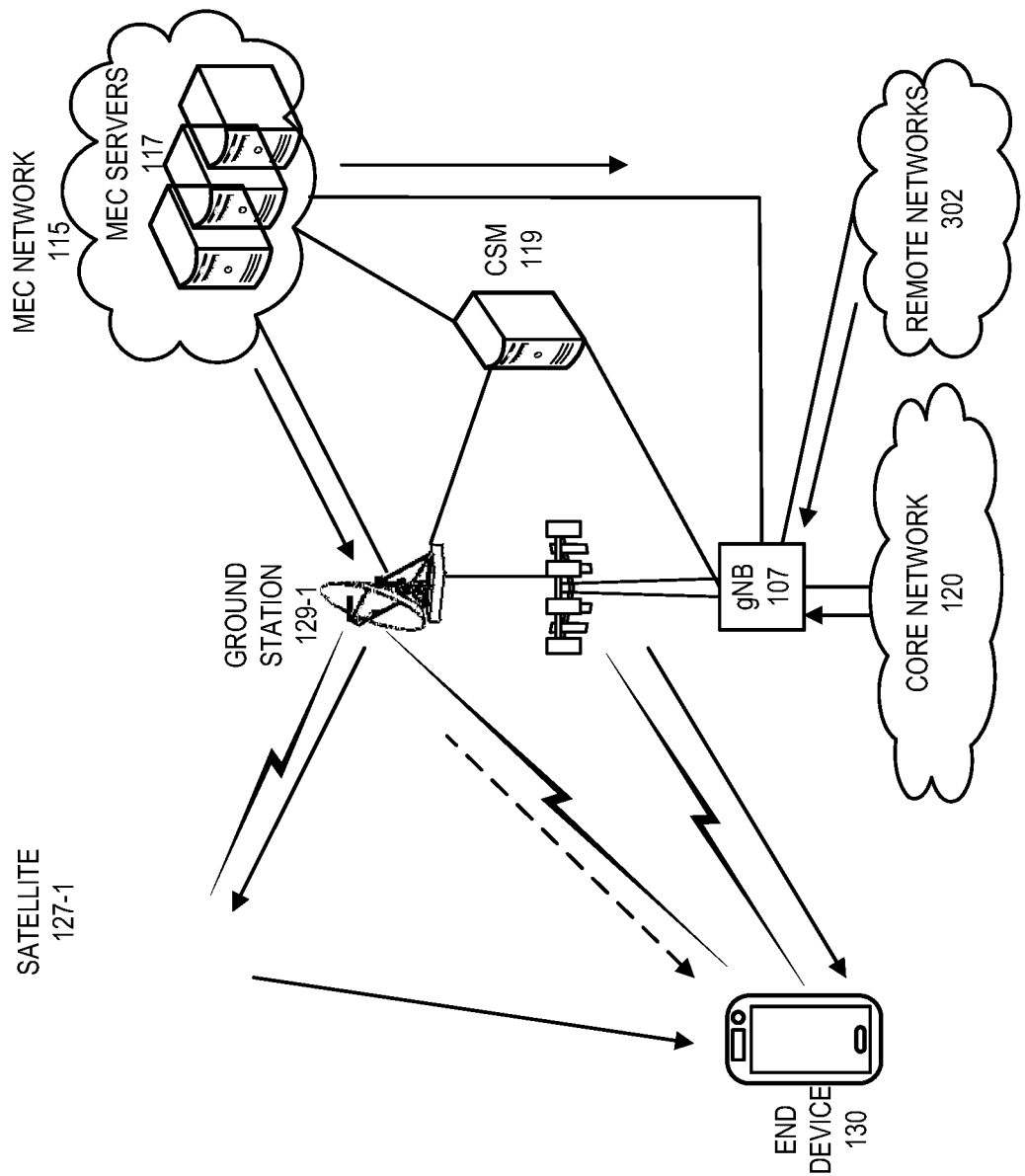

FIGS. 3F-3I are diagrams illustrating exemplary downlink configurations of an exemplary embodiment of cellular device-satellite communications service. Referring to FIG. 3F, according to an exemplary downlink configuration 365, a downlink connection or downlink traffic may flow from MEC network 115 to ground station 129-1. According to this example, the downlink connection or traffic flow may be between ground station 129-1 and satellite 127-1 and then onward to end device 130, or between ground station 129-1 to end device 130, for example. According to another example, not illustrated, satellite 127-1 may have a downlink connection or downlink traffic from another remote application service source (e.g., remote networks 302). Referring to FIG. 3G, according to another exemplary downlink configuration 375, a downlink connection or downlink traffic may flow from MEC network 115 to ground station 129-1. According to this example, the downlink connection or traffic flow may be between ground station 129-1 and gNB 107 and then onward to end device 130. Referring to FIG. 3H, according to yet another exemplary downlink configuration 385, a downlink connection or downlink traffic may flow from MEC network 115 to gNB 107 and then to end device 130. According to another example, the downlink connection or traffic flow may be from core network 120 or remote networks 302 to gNB 107 and then onward to end device 130. Referring to FIG. 3I, according to still another exemplary downlink configuration 395, a dual connectivity downlink configuration including both terrestrial and satellite connections/traffic flows may be from MEC network 115 to gNB 107 and to end device 130, and additionally, from MEC network 115 to ground station 129-1 and onward to end device 130 directly or indirectly via satellite 127-1. According to another example, the downlink connection or downlink traffic flow may be from core network 120 or remote networks 302 to gNB 107. Additionally, for example, a satellite connection downlink to end device 130 may be sourced from packet data network 115 or remote networks 302 via another satellite 127, for example.

FIGS. 3B-3I illustrate exemplary uplink and downlink configurations, according to other exemplary embodiments, cellular device-satellite communications service may include additional or different configurations. For example, communication link 316 between ground station 129-1 and gNB 107 may yield other dual connectivity or higher combinations of connections and/or traffic flows not specifically described. Additionally, the exemplary uplink and downlink configurations may be implemented according to various indoor and outdoor scenarios and contexts. According to some exemplary embodiments, cell-satellite manager 119 may select one available satellite over another available satellite based on the application service and/or a performance metric of the application service. For example, cell-satellite manager 119 may select a satellite of a LEO satellite network over a satellite of a MEO satellite network for an uplink and/or a downlink configuration, which may yield a lower latency and/or provide better support of an application service.

FIG. 4 is a diagram illustrating exemplary components of a device 400 that may be included in one or more of the devices described herein. For example, device 400 may correspond to access device 107, external device 117, cell-satellite manager 119, core device 122, end device 130, gNB 107, MEC servers 117, ground station 129, and/or other types of network devices, as described herein. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation, or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, learning, model-based, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid-state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to cell-satellite manager 119, software 420 may include an application that, when executed by processor 410, provides a function and/or a process of cellular device-satellite communications service, as described herein. According to another example, with reference to another type of access device 107, such as gNB 107, software 420 may include an application that, when executed by processor 410, provides a function and/or a process of cellular device-satellite communications service, as described herein. According to yet another example, with reference to end device 130, software 420 may include an application that, when executed by processor 410, provides a function and/or a process of cellular device-satellite communications service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service-based interface, or a reference interface, for example.

Input 430 permits an input into device 400. For example, input 430 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, created, deleted, or some other operational state during its life cycle (e.g., refreshed, paused, suspended, rebooting, or another type of state or status), using well-known virtualization technologies (e.g., hypervisor, container engine, virtual container, virtual machine, etc.) in an application service layer network (e.g., external network 115) and/or another type of network (e.g., access network 105, core network 120, etc.). Thus, network devices described herein may be implemented as device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a function or a process described herein. Alternatively, for example, according to other implementations, device 400 performs a function or a process described herein based on the execution of hardware (processor 410, etc.).

Figure 5A:
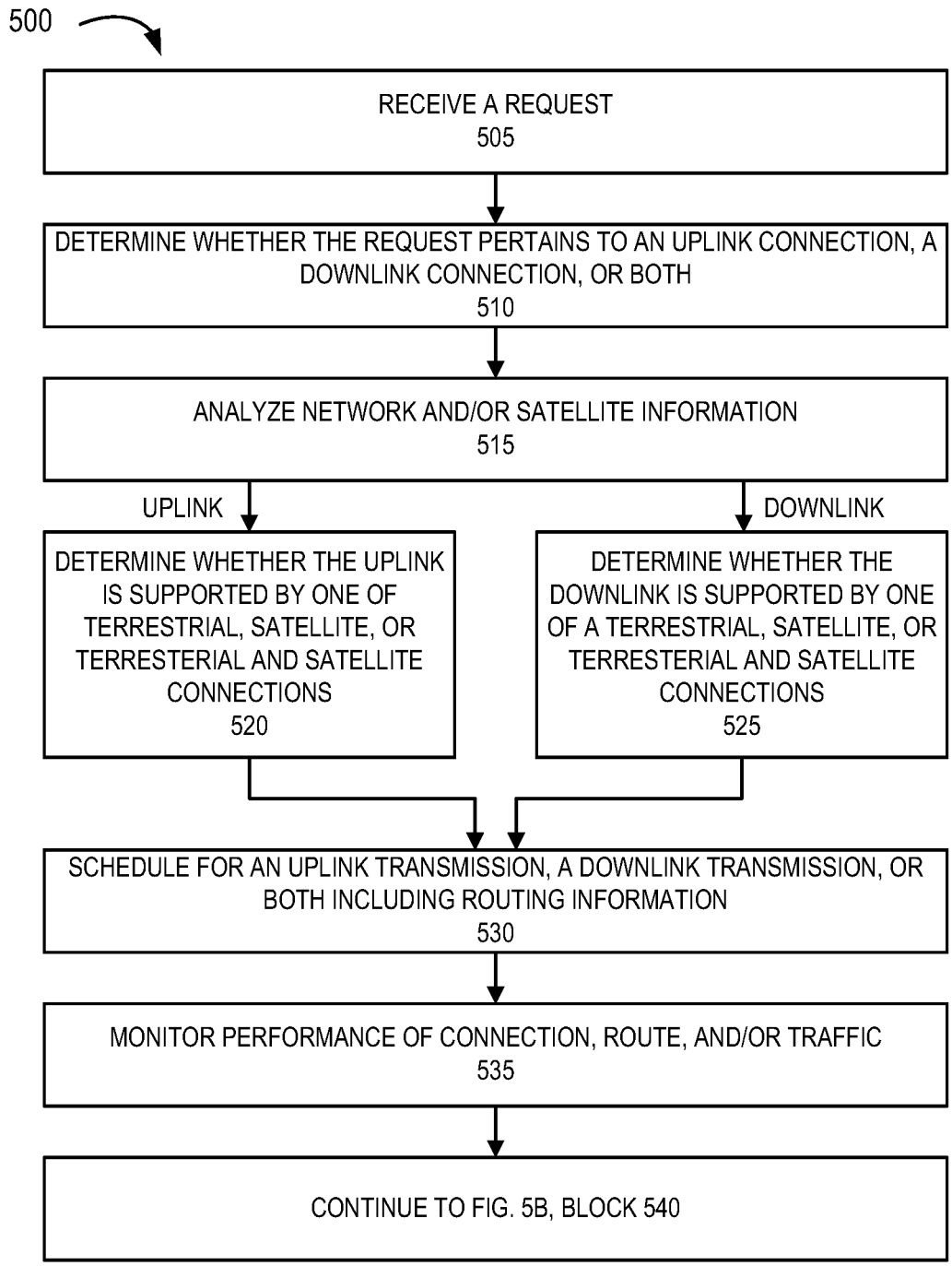
FIGS. 5A and 5B are flow diagrams illustrating an exemplary process of an exemplary embodiment of cellular device-satellite communications service.
Figure 5B:
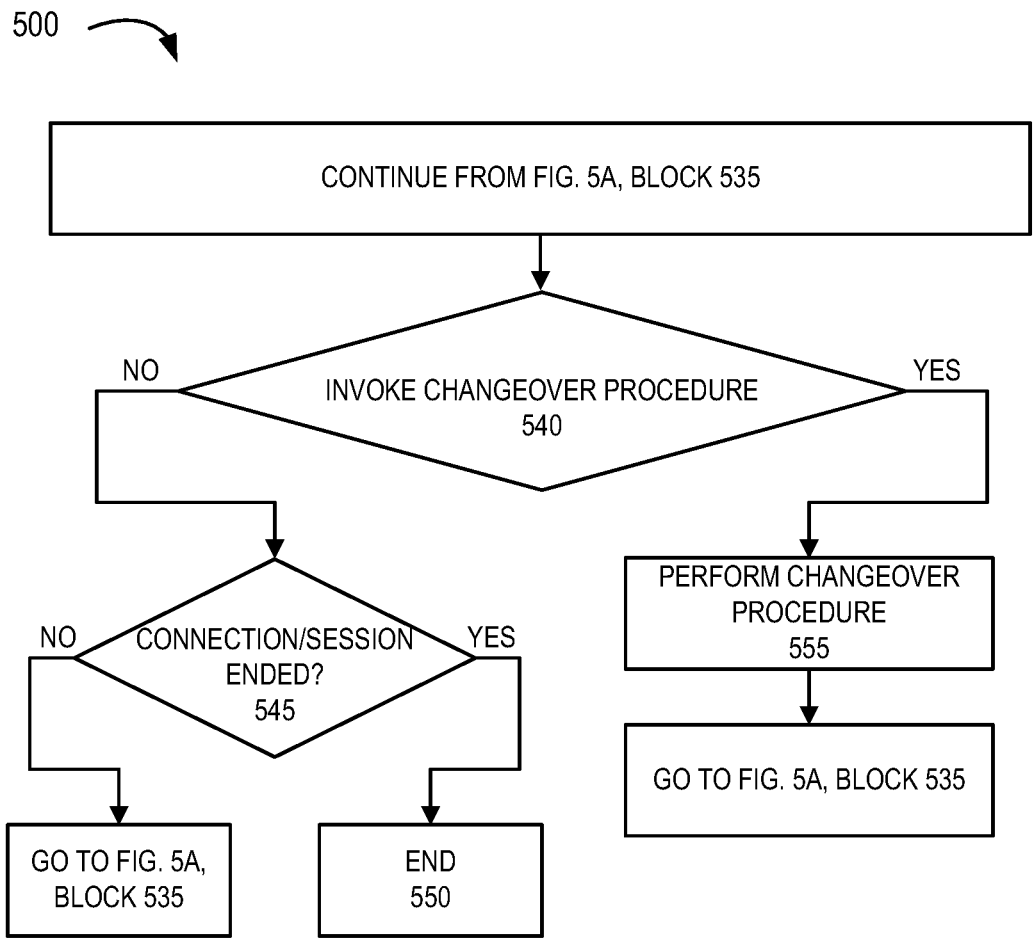

FIGS. 5A and 5B are flow diagrams illustrating an exemplary process 500 of an exemplary embodiment of cellular device-satellite communications service. According to an exemplary embodiment, cell-satellite manager 119 or a component of cell-satellite manager 119 may perform a step of process 500. According to an exemplary implementation, processor 410 executes software 420 to perform the step of process 500, as described herein. Alternatively, the step may be performed by execution of only hardware.

Referring to FIG. 5A, in block 505, cell-satellite manager 119 may receive a request. For example, the request may be a connection request, such as from an application service server to end device 130, or vice versa. Alternatively, the request may be to establish an application service session.

In block 510, cell-satellite manager 119 may determine whether the request pertains to an uplink connection, a downlink connection, or both. For example, depending on the application service, the application service may support user plane communication in both the uplink and downlink, or in just the uplink or the downlink. Cell-satellite manager 119 may make this determination based on the request, the application service, and/or other information, such as the type of end device 130 (e.g., IoT versus smartphone) or network policies or rules pertaining to end device 130, for example.

In block 515, cell-satellite manager 119 may analyze network information and/or satellite information. For example, cell-satellite manager 119 may analyze current or predictive states associated with uplink and/or downlink links, congestion levels, resource utilization values and capacity values, position and mobility of end device 130, performance metrics, and other information (e.g., satellite connectivity information, satellite routing information, etc.) that may be obtained by cell-satellite manager 119, for example, as described herein.

In blocks 520 and 525, cell-satellite manager 119 may determine whether the uplink and/or the downlink is (to be) supported by a terrestrial only connection/route, a satellite connection/route, or both terrestrial and satellite connections/routes based on the analysis of the network information and request. Cell-satellite manager 119 may coordinate the uplink connection and/or the downlink connection that supports user plane traffic flow based on such a determination. For example, cell-satellite manager 119 may transmit control information to access device 107, ground station 129, core device 122, and/or other network devices to establish an end-to-end connection. According to some exemplary embodiments, cell-satellite manager 119 may determine that the uplink and/or the downlink is to be supported by a satellite connection/route when there is a certain level of congestion (e.g., above a threshold congestion value) in the terrestrial network (e.g., access network 105, access device 107 serving end device 130, core network 120, etc.), insufficient or underperforming radio access network coverage pertaining to end device 130 (e.g., signal level between end device 130 and serving access device 107 below a threshold value, etc.), deficiencies in performance metrics associated with application service sessions and access network 105 and/or core network 120, and/or another configurable criterion. According to other exemplary embodiments, cell-satellite manager 119 may determine that the uplink and/or the downlink is to be supported by a satellite connection/route based on load balancing policies and/or rules.

In block 530, cell-satellite manager 119 may schedule for an uplink transmission, a downlink transmission, or both including routing information. For example, cell-satellite manager 119 may analyze, calculate, and determine schedules and routes for uplink and downlink user plane traffic associated with application service sessions via terrestrial and/or satellite connections based on network information and satellite connectivity and routing information. Cell-satellite manager 119 may communicate, via the control plane, schedules and routing information to various network devices (e.g., access device 107, ground station 129, etc.) for the user plane traffic.

In block 535, cell-satellite manager 119 may monitor performance of a connection, a route, and/or traffic. For example, cell-satellite manager 119 may monitor connectivity states (e.g., connected, not connected, intermittent connection, etc.), routing performance, and traffic flow performance (e.g., latency, throughput, error rate, etc.), network state information (e.g., congestion, etc.), and/or end device information (e.g., mobility, signal quality, etc.) in relation to satellite and terrestrial connections, routes, and traffic flows.

Referring to FIG. 5B, in block 540, cell-satellite manager 119 may be determine whether to invoke a changeover procedure. For example, cell-satellite manager 119 may determine to invoke the changeover procedure when there are connectivity issues, underperforming routes, underperforming traffic flow performance, congestion level, and/or poor end device coverage, signal quality, and so forth based on network and satellite information. Otherwise, cell-satellite manager 119 may determine to not invoke the changeover procedure. For example, cell-site manager 119 may determine that connectivity issues, underperforming routes, underperforming traffic flow performance, congestion level, and/or poor end device coverage, signal quality, etc. are below a threshold level with respect to adverse impact on the application service session. As another example, cell-site manager 119 may determine that an amount of time remaining for the application service session does not warrant the changeover despite the threshold level being exceeded.

When it is determined to not invoke the changeover procedure (block 540—NO), it may be determined whether the connection and/or session ends (block 545). For example, cell-satellite manager 119 may determine whether the application service session ended or timed out When it is determined that the connection and/or session is not to end (block 545—NO), process 500 may continue to FIG. 5A, block 535. When it is determined that the connection and/or session is to end (block 545—YES), process 500 may end (block 550). For example, cell-satellite manager 119 may tear down the uplink and/or downlink connection.

When it is determined to invoke the changeover procedure (block 540—YES), the changeover procedure may be performed (block 555). For example, cell-satellite manager 119 may select a new connection configuration (e.g., in the uplink, the downlink, or both) based on network information and satellite information. Cell-satellite manager 119 may provide new connection or routing information to network devices (e.g., access device 107, ground station 129, etc.) and end device 130. The network devices and end device 130 may adjust connection and/or route configurations. User plane traffic may be buffered for the changeover uplink and/or downlink path to be established. Cell-satellite manager 119 may tear down the old uplink and/or downlink connection associated with the application service session via the network devices and end device 130. Process 500 may continue to FIG. 5A, block 535.

FIGS. 5A and 5B illustrate an exemplary embodiment of a process of cellular device-satellite communications service, however according to other exemplary embodiments, the cellular device-satellite communications service may perform additional operations, fewer operations, and/or different operations than those illustrated and described.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the process illustrated in FIGS. 5A and 5B, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   receiving, by a network device, a request for an application service;
   determining, by the network device based on the request, whether an uplink connection, a downlink connection, or both support the application service;
   analyzing, by the network device, information pertaining to a satellite network and a radio access network;
   determining, by the network device based on the analyzing and the request, whether the uplink connection, the downlink connection, or both is prospectively supported by at least one of a terrestrial connection or a satellite connection;
   selecting, by the network device based on determining the at least one of the terrestrial connection or the satellite connection, at least one of the uplink connection or the downlink connection;
   coordinating, by the network device, the at least one of the uplink connection or the downlink connection between an end device and a second network device that provides the application service;
   scheduling, by the network device, for the at least one of the uplink connection or the downlink connection, wherein the scheduling includes routing information for user plane traffic associated with an application service session; and
   monitoring, by the network device and during the application service session, a user plane traffic flow performance for the at least one of the uplink connection or the downlink connection.

2. The method of claim 1, further comprising:
   calculating, by the network device, a schedule for transmission of the user plane traffic associated with the application service session via the at least one of the uplink connection or the downlink connection; and
   communicating, by the network device and via a control plane, the schedule to the satellite network and the radio access network.

3. The method of claim 1, wherein the information includes satellite connectivity between a satellite and a ground station, and satellite routing information.

4. The method of claim 1, wherein the uplink connection includes a first connection between the end device and a ground station via a radio access network device of the radio access network, or a second connection between the end device and the ground station not via the radio access network device, wherein the ground station communicates to a satellite of the satellite network.

5. The method of claim 1, wherein the downlink connection includes a first connection between a radio access network device of the radio access network and the end device and a second connection between a satellite and the end device.

6. The method of claim 1, wherein the analyzing comprises:
   determining, by the network device, a congestion in a radio access network device serving the end device, and wherein the coordinating comprises:
   transmitting, by the network device based on the congestion, control information to establish a first connection between a satellite of the satellite network and the end device.

7. The method of claim 1, further comprising:
   determining, by the network device based on the monitoring, whether to change the at least one of the uplink connection or the downlink connection.

8. The method of claim 1, wherein the analyzing comprises:
   determining, by the network device, a signal level, which pertains to a radio access network device serving the end device and the end device, is below a threshold value, and wherein the coordinating comprises:
   coordinating, by the network device based on the signal level, execution of at least one of the downlink connection that includes a first connection between a satellite of the satellite network and the end device or the uplink connection from an end device that includes a second connection between a ground station and the satellite of the satellite network.

9. A network device comprising:
   a memory, wherein the memory stores instructions; and
   a processor configured to execute the instructions to:
   receive a request for an application service;
   determine, based on the request, whether an uplink connection, a downlink connection, or both support the application service;
   analyze information pertaining to a satellite network and a radio access network;
   determine, based on the analysis and the request, whether the uplink connection, the downlink connection, or both is prospectively supported by at least one of a terrestrial connection or a satellite connection;
   select, based on a determination of the at least one of the terrestrial connection or the satellite connection, at least one of the uplink connection or the downlink connection;
   coordinate the at least one of the uplink connection or the downlink connection between an end device and a second network device that provides the application service;
   schedule, for the at least one of the uplink connection or the downlink connection, wherein the scheduling includes routing information for user plane traffic associated with an application service session; and
   monitor, during the application service session, a user plane traffic flow performance for the at least one of the uplink connection or the downlink connection.

10. The network device of claim 9, wherein the processor further executes the instructions to:
    calculate a schedule for transmission of the user plane traffic of associated with the application service session via the at least one of the uplink connection or the downlink connection; and
    communicate, via a control plane, the schedule to the satellite network and the radio access network.

11. The network device of claim 9, wherein the information includes satellite connectivity between a satellite and a ground station, and satellite routing information.

12. The network device of claim 9, wherein the uplink connection includes a first connection between the end device and a ground station via a radio access network device of the radio access network, or a second connection between the end device and the ground station not via the radio access network device, wherein the ground station communicates to a satellite of the satellite network.

13. The network device of claim 9, wherein the downlink connection includes a first connection between a radio access network device of the radio access network and the end device and a second connection between a satellite and the end device.

14. The network device of claim 9, wherein, when analyzing, the processor further executes the instructions to:
    determine a congestion in a radio access network device serving the end device, and wherein coordinating, the processor is further configured to:
    transmit, based on the congestion, control information to establish a first connection between a satellite of the satellite network and the end device.

15. The network device of claim 9, wherein the processor further executes the instructions to:
    determine, based on the monitoring, whether to change the at least one of the uplink connection or the downlink connection.

16. The network device of claim 9, wherein, when analyzing, the processor further executes the instructions to:
    determine a signal level, which pertains to a radio access network device serving the end device and the end device, is below a threshold value, and wherein coordinating, the processor is further configured to:
    coordinate execution of at least one of the downlink connection that includes a first connection between a satellite of the satellite network and the end device or the uplink connection from an end device that includes a second connection between a ground station and the satellite of the satellite network.

17. A non-transitory computer-readable storage medium storing instructions executable by a processor of a network device, which when executed cause the processor to:
    receive a request for an application service;
    determine, based on the request, whether an uplink connection, a downlink connection, or both support the application service;
    analyze information pertaining to a satellite network and a radio access network;
    determine, based on the analysis and the request, whether the uplink connection, the downlink connection, or both is prospectively supported by at least one of a terrestrial connection or a satellite connection;
    select, based on a determination of the at least one of the terrestrial connection or the satellite connection, at least one of the uplink connection or the downlink connection;
    coordinate the at least one of the uplink connection or the downlink connection between an end device and a second network device that provides the application service;
    schedule, for the at least one of the uplink connection or the downlink connection, wherein the scheduling includes routing information for user plane traffic associated with an application service session; and
    monitor, during the application service session, a user plane traffic flow performance for the at least one of the uplink connection or the downlink connection.

18. The non-transitory computer-readable storage medium of claim 17, wherein the instructions comprise further instructions, which when executed, cause the processor to:
    calculate a schedule for transmission of the user plane traffic associated with the application service session via the at least one of the uplink connection or the downlink connection; and
    communicate, via a control plane, the schedule to the satellite network and the radio access network.

19. The non-transitory computer-readable storage medium of claim 17, wherein the instructions to analyze comprise further instructions, which when executed, cause the processor to:
    determine a signal level, which pertains to a radio access network device serving the end device and the end device, is below a threshold value, and wherein the instructions to coordinate further comprising instructions, which when executed, cause the processor to:

transmit control information to establish at least one of the downlink connection that includes a first connection between a satellite of the satellite network and the end device or the uplink connection from an end device that includes a second connection between a ground station and the satellite of the satellite network.

20. The non-transitory computer-readable storage medium of claim 17, wherein the information includes satellite connectivity between a satellite and a ground station, and satellite routing information.

* * * * *